United States Patent
de Heer

(10) Patent No.: US 8,320,374 B2
(45) Date of Patent: Nov. 27, 2012

(54) METHOD AND APPARATUS FOR IMPROVED MULTICAST ROUTING

(75) Inventor: Arie Johannes de Heer, Hengelo (NL)

(73) Assignee: Alcatel Lucent, Paris (FR)

( * ) Notice: Subject to any disclaimer, the term of this patent is extended or adjusted under 35 U.S.C. 154(b) by 966 days.

(21) Appl. No.: 11/617,051

(22) Filed: Dec. 28, 2006

(65) Prior Publication Data

US 2008/0159285 A1 Jul. 3, 2008

(51) Int. Cl.
*H04L 12/28* (2006.01)
(52) U.S. Cl. .................. 370/390; 379/347; 710/316
(58) Field of Classification Search .................. 370/389, 370/328, 349, 390, 401; 709/230, 249; 707/1
See application file for complete search history.

(56) References Cited

U.S. PATENT DOCUMENTS

| | | | |
|---|---|---|---|
| 6,065,064 A * | 5/2000 | Satoh et al. ................... 709/249 |
| 6,363,070 B1 | 3/2002 | Mullens et al. | |
| 6,553,030 B2 * | 4/2003 | Ku et al. ....................... 370/390 |
| 6,556,575 B1 * | 4/2003 | Denio et al. .................. 370/401 |
| 6,973,057 B1 * | 12/2005 | Forslow ........................ 370/328 |
| 7,424,004 B2 * | 9/2008 | Hattig ............................ 370/349 |
| 2005/0021491 A1 * | 1/2005 | Horgan .............................. 707/1 |
| 2007/0078997 A1 * | 4/2007 | Stern .............................. 709/230 |

FOREIGN PATENT DOCUMENTS

JP 2004356883 A 12/2004

OTHER PUBLICATIONS

PCT Search Report & Written Opinion in PCT/US2007/026027, dated Jul. 15, 2008, 12 pages.
Office Action in Japanese Application No. 2009-544039, Alcatel-Lucent USA Inc., Applicant, mailed Jun. 28, 2011, 2 pages.

* cited by examiner

*Primary Examiner* — Dang Ton
*Assistant Examiner* — Lionel Preval
(74) *Attorney, Agent, or Firm* — Wall & Tong, LLP

(57) ABSTRACT

The invention includes a method and apparatus for transmitting packets in a network comprising a plurality of nodes. A method includes encapsulating a packet intended for at least one of the nodes where the packet is encapsulated using a bit set, comparing the bit set of the packet and a bit mask of an interface, and forwarding the packet over the interface in response to a determination that the comparison of the bit set and the bit mask indicates that one of the nodes for which the packet is intended is the same as one of the nodes available from the interface. The bit set and bit mask each include bit positions associated with the respective plurality of nodes. The bit positions of the bit set and bit mask identify each of the at least one of the nodes for which the packet is intended and each of the nodes available from the interface, respectively.

20 Claims, 8 Drawing Sheets

100

300

400

500

600

700

METHOD AND APPARATUS FOR IMPROVED MULTICAST ROUTING

FIELD OF THE INVENTION

The invention relates to the field of communication networks and, more specifically, to multicast routing in packet networks.

BACKGROUND OF THE INVENTION

In packet-based networks an identifier indicative of the destination of a data packet is typically added to each data packet. The identifier may be globally unique over the entire network (e.g., Ethernet) or locally unique over a portion of the network (e.g., for a specific link such as Multi-Protocol Label Switching (MPLS)). An advantage of globally unique identifiers is elimination of a requirement for a signaling protocol to create a connection prior to information transfers. For locally unique identifiers, since each pair of nodes along the routing path must agree on assignment of an identifier to each transferred frame, a signaling protocol is required.

For unicast communications, globally unique identifiers enable efficient routing of packets through the network (i.e., each endpoint is associated with an identifier which operates as a unique address for the endpoint). This model is used in existing networks (e.g., Ethernet networks and Internet Protocol (IP) networks). In this model, for an identifier size of x bits, at most $2^x$ endpoints may be supported. This model for unicast communications is operationally efficient. Disadvantageously, however, multicast communications may be significantly more complicated. In multicast communications, a multicast tree (including endpoints interested in receiving particular traffic) must generally be formed prior to transmission of the particular traffic.

Furthermore, for multicast communications, since each possible subset of endpoints may form a multicast group, for a network having n endpoints, $2^n-n$ possible multicast groups may be formed in the network. Since $n=2^x$ (where x is the number of bits in each identifier), $2^x$ bits are required in order to uniquely identify each possible multicast group. Since, in general, only a subset of possible multicast groups will be utilized, the actual number of multicast group identifiers may be lower (e.g., typically on the order of the number of unicast identifiers). Although an existing approach utilizes an additional bit in the identifier for distinguishing between a unicast identifier and a multicast identifier, this approach still requires a signaling mechanism for maintaining associations between multicast groups and multicast identifiers.

SUMMARY OF THE INVENTION

Various deficiencies in the prior art are addressed through the invention of a method and apparatus for transmitting packets in a network comprising a plurality of nodes. A method includes encapsulating a packet intended for at least one of the nodes where the packet is encapsulated using a bit set, comparing the bit set of the packet and a bit mask of an interface, and forwarding the packet over the interface in response to a determination that the comparison of the bit set and the bit mask indicates that one of the nodes for which the packet is intended is the same as one of the nodes available from the interface. The bit set and bit mask each include bit positions associated with the respective plurality of nodes. The bit positions of the bit set and bit mask identify each of the at least one of the nodes for which the packet is intended and each of the nodes available from the interface, respectively.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
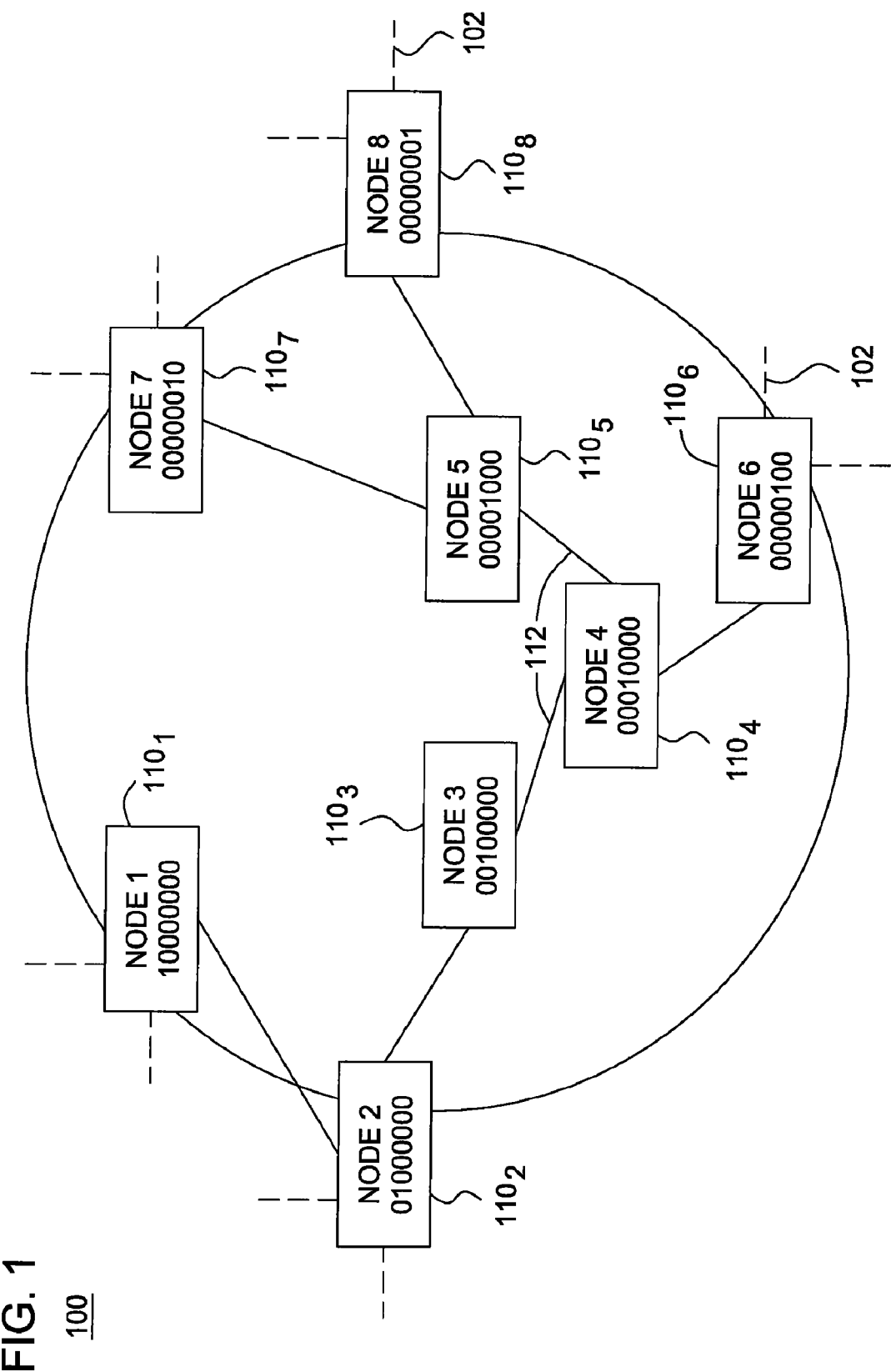
FIG. 1 depicts a high-level block diagram of a communication network.

FIG. 1 depicts a high-level block diagram of a communication network. The communication network 100 of FIG. 1 includes a plurality of nodes $110_0$-$110_7$ (collectively, nodes 110). The nodes 110 support various combinations of network interfaces (NIs) 112 and/or external interfaces (EIs) 102. The nodes 110 communicate using NIs 112. The nodes 110 communicate with external devices (e.g., nodes of other network domains, user devices, and the like) using EIs 102. The NIs 112 may include network links. The EIs 102 may include external links.

The nodes 110 include communication nodes supporting packet-based communications. In one embodiment, nodes 110 include communication nodes supporting any communication technologies supporting multicast capabilities, such as Internet Protocol (IP), Multiprotocol Label Switching (MPLS), Ethernet, and the like, as well as various combinations thereof. The NIs 112 and EIs 112 include interfaces supporting any communication technologies supported by associated nodes 110.

Although primarily depicted and described herein with respect to a communication network having specific types, numbers, and configurations of nodes 110, NIs 112, and EIs 102, the present invention may be implemented in communication networks having various other types, numbers, and configurations of nodes 110, NIs 112, and EIs 102. Similarly, although primarily depicted and described herein with respect to specific multicast communication technologies, the present invention may be implemented using various other unicast communication technologies, multicast communication technologies, and the like, as well as various combinations thereof.

As depicted in FIG. 1, for a network of N nodes, each node is assigned a unique identifier having N bits. The unique identifier of N bits includes N bit positions, where each of the N bit positions is associated with one of the nodes. As depicted in FIG. 1, since communication network 100 includes 8 nodes, each of the nodes 110 is assigned a unique 8-bit identifier, where, for each node, the bit position of the unique 8-bit identifier for that node is set to 1 and the bit positions of the unique 8-bit identifier for all other nodes is set to 0. Specifically, nodes $110_1$-$110_8$ are assigned identifiers 10000000, 01000000, 00100000, 00010000, 00001000, 00000100, 00000010, and 00000001, respectively.

As described herein, use of such unique N-bit identifiers (having one bit position associated with each node of the communication network) may be used for creation of unicast labels for packets intended for a single node, and greatly simplifies creation of multicast labels for packets intended for multiple nodes. For example, a packet intended for delivery to node $110_6$ may be encapsulated with a unicast label of 00000100, a packet intended for delivery to nodes $110_6$, $110_7$, and $110_8$ may be encapsulated with a multicast label of 00000111, a packet intended for delivery to nodes $110_2$, $110_5$, and $110_8$ may be encapsulated with a multicast label of 01001001, and so on. The labels may be more commonly referred to herein as bit sets.

Upon receiving a packet at a node 110, the receiving node 110 uses the label of the packet to determine whether a received packet should be forwarded over one or more EIs 102 associated with that node 110 (i.e., to determine whether the packet is intended for that node 110), and to determine whether the received packet should be forwarded over one or more NIs 112 associated with that node 110 (i.e., to determine whether the packet is intended for at least one other node 110). The operation of nodes 110 may be better understood with respect to FIG. 2 and FIG. 3 depicted and described herein.

Figure 2:
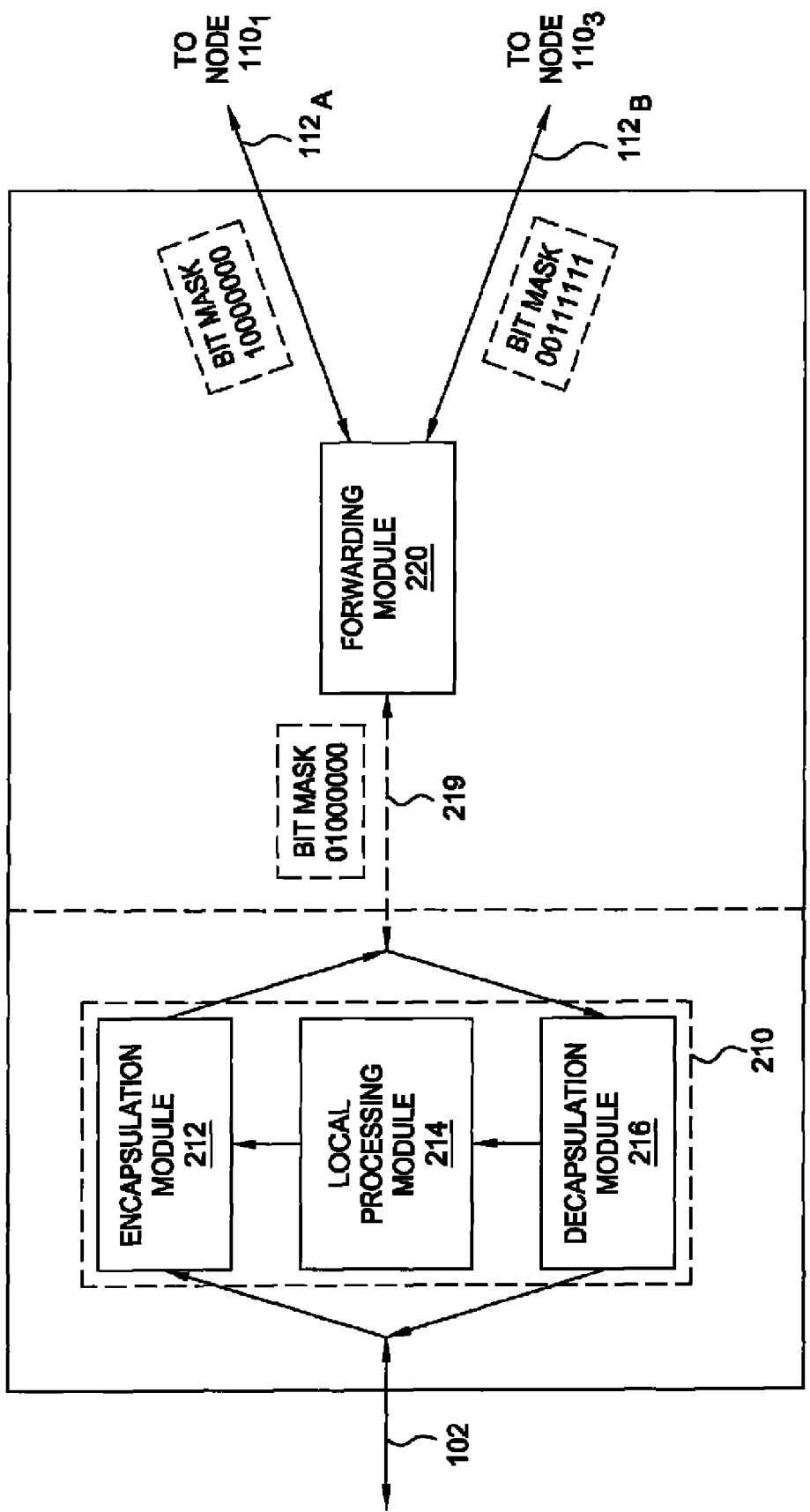
FIG. 2 depicts a high-level block diagram of one of the nodes of the communication network of FIG. 1.
Figure 3:
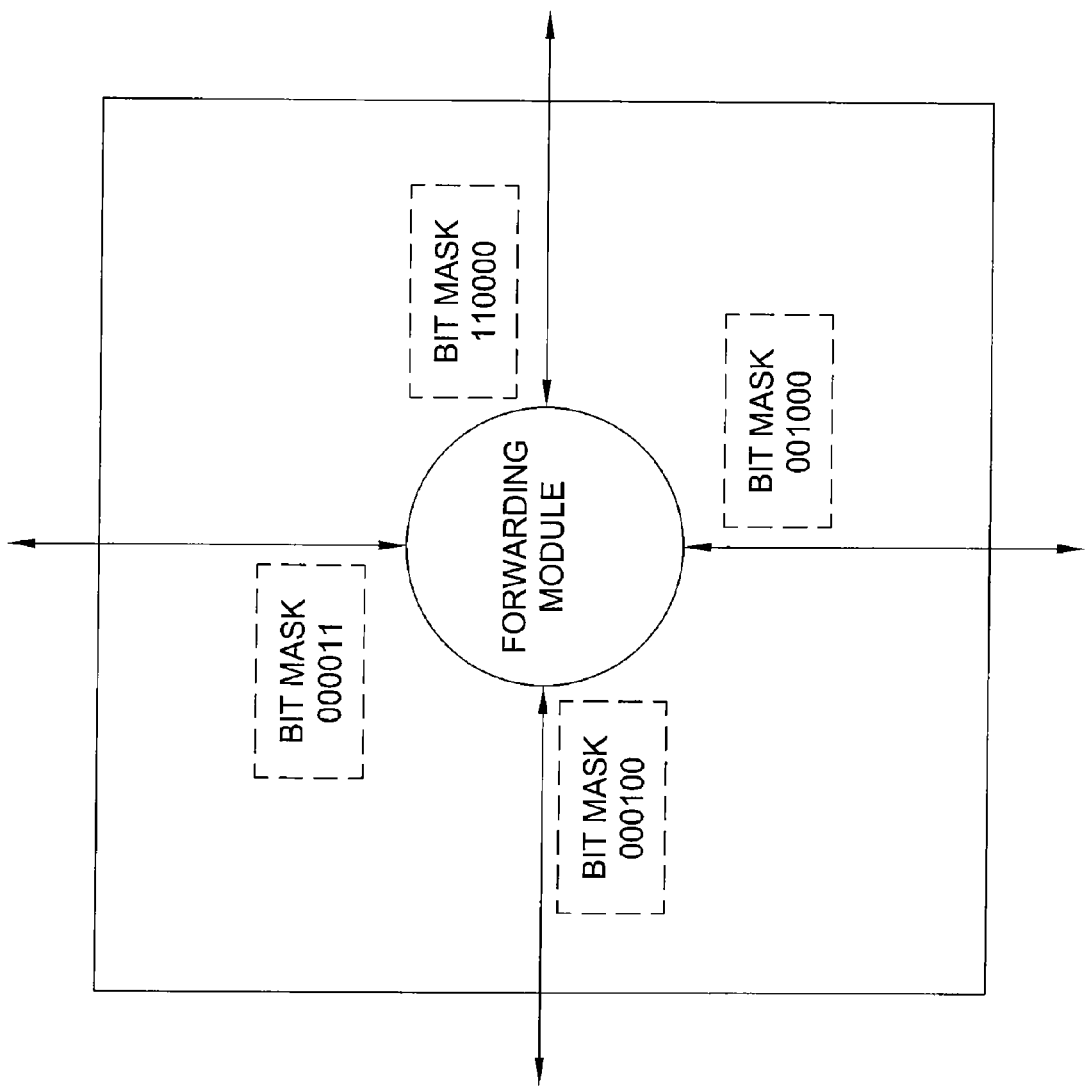
FIG. 3 depicts a high-level block diagram of an exemplary node including one forwarding module without any end-node modules.

FIG. 2 depicts a high-level block diagram of one of the nodes of the communication network of FIG. 1. Specifically, node $110_1$ includes an end-node module 210 and a forwarding module 220. The end-node module 210 operates as an interface to EIs 102. The forwarding module 220 operates as an interface to NIs 112. The end-node module 210 and forwarding module 220 communicate via an internal interface (II) 219. The end-node module 210 includes an encapsulation module 212, a local processing module 214, and a decapsulation module 216. The EIs 102 transmit packets to encapsulation module 212 and receives packets from decapsulation module 216. The II 219 transports packets from encapsulation module 212 to forwarding module 220 and transports packets from forwarding module 220 to decapsulation module 216.

For a packet received over one of the EIs 102 of a node 110 (or a packet generated locally by local processing module 214 of node 110), end-node module 210 directs the packet to encapsulation module 212. The encapsulation module identifies one or more nodes for which the received packet is intended. The encapsulation module 212 identifies the one or more nodes for which the received packet is intended according to the interface over which the received packet was received and/or information included within the received packets, and the like, as well as various combinations thereof. The encapsulation module 212 may identify the one or more nodes for which the receive packet is intended using any information included within the received packet. For example, encapsulation module 212 may identify the one or more nodes for which the receive packet is intended using an MPLS label (for an MPLS packet), an IP Address (for an IP packet), or an Ethernet address or virtual local area network (VLAN) identifier (for an Ethernet packet), and the like.

The encapsulation module 212 encapsulates the packet by adding a bit set to the received packet. The bit set identifies the one or more nodes 110 for which the packet is intended. The encapsulation module 212 provides the encapsulated packet to forwarding module 220 using an internal interface (II) 219 between end-node module 210 and forwarding module 220. The forwarding module 220 receives the encapsulated packet from encapsulation module 212. The forwarding module 220 determines one or more NIs 112 over which the encapsulated packet should be transmitted. In one embodiment, the forwarding module 220 determines the one or more NIs over which the encapsulated packet should be transmitted using one or more bit masks associated with the one or more NIs 112, respectively. The forwarding module 212 transmits the encapsulated packet over the one or more identified NIs 112.

For a packet received over one of the NIs 112 of a node 110, forwarding module 212 receives the packet. The forwarding module 212 determines where to direct the received packet. If the received packet is intended for another node 110, forwarding module 220 directs the received packet to one or more other NIs 112 associated with the node. If the received packet is intended for that node 110, forwarding module 212 directs the received packet to decapsulation module 216 (illustratively, using an internal interface (II) 219). The decapsulation module 216 decapsulates the packet to remove the bit set from the received packet. The decapsulation module 216 determines one or more EIs 102 over which the decapsulated packet should be transmitted. The decapsulation module 216 may determine the one or more EIs 102 over which the decapsulated packet should be transmitted using routing information included within the packet. The decapsulation module 216 transmits the decapsulated packet over the one or more identified EIs 102.

As depicted in FIG. 2, forwarding module 220 maintains a bit mask for each interface (including an II 219 and NIs 112) associated with forwarding module 220. A bit mask associated with an interface identifies one or more nodes 110 associated with that interface. The bit mask associated with the internal interface is identical to the node identifier of that node. As depicted in FIG. 2, the bit mask associated with II 219 is 01000000 (thereby ensuring that forwarding module 216 directs packets intended for node $110_2$ to end-node module 210). As depicted in FIG. 2, the bit mask associated with NI $112_A$ is 10000000 because node $110_1$ is the only node which can be reached from NI $112_A$ of $110_2$. As depicted in FIG. 2, the bit mask associated with NI $112_B$ is 00111111 because each of nodes $110_3$, $110_4$, $110_5$, $110_6$, $110_7$, and $110_8$, can be reached, directly or indirectly, from NI $112_B$ of $110_2$.

In one embodiment, upon receiving a packet (either from II 219 or one of NIs 112), for each interface associated with forwarding module 220, forwarding module 220 performs a bitwise AND operation of the bit mask of the interface and the bit set of the received packet in order to determine whether to transmit the received packet over that interface.

In one example, assume end-node module 210 of node $110_2$ receives a packet intended for nodes $110_6$ and $110_8$. The encapsulation module 212 encapsulates the packet with a bit set of 00000101 indicating that the packet is intended for nodes $110_6$ and $110_8$. The encapsulation module 212 provides the encapsulated packet to forwarding module 220 using II 219. The forwarding module 220 performs a bitwise AND operation of bit set 00000101 and bit mask 10000000 associated with NI $112_A$. Since none of the bit positions of the bit set and bit mask are both set to 1, the result of the bitwise AND operation is 00000000. Since none of the bit positions of the result of the bitwise AND operation are set to 1, forwarding module 220 does not transmit the encrypted packet over NI $112_A$. The forwarding module 220 performs a bitwise AND operation of bit set 00000101 and bit mask 00111111 associated with NI $112_B$. Since bit positions 6 and 8 of both the bit set and the bit mask are set to 1, the result of the bitwise AND operation is 00000101. Since at least one of the bit positions of the result of the bitwise AND operation is set to 1, forwarding module 220 transmits the encrypted packet over NI $112_B$.

In one example, assume forwarding module 220 of node $110_2$ receives a packet from node $110_1$ over NI $112_A$, where the packet is intended for nodes $110_2$, $110_6$, $110_7$, and $110_8$ (i.e., the bit set of the received packet is set to 01000111). The forwarding module 220 performs a bitwise AND operation of bit set 01000111 and bit mask 01000000 associated with II 219. Since bit position 2 of both the bit set and the bit mask is set to 1, the result of the bitwise AND operation is 01000000. Since at least one of the bit positions of the result of the bitwise AND operation is set to 1, forwarding module 220 transmits the encrypted packet over II 219 (to decapsulation module 216). The forwarding module 220 performs a bitwise AND operation of bit set 01000111 and bit mask 00111111 associated with NI $112_B$. Since bit positions 6, 7, and 8 of both the bit set and the bit mask are set to 1, the result of the bitwise AND operation is 00000111. Since at least one of the bit positions of the result of the bitwise AND operation is set to 1, forwarding module 220 transmits the encrypted packet over NI $112_B$.

Although primarily depicted and described herein with respect to a specific node configuration having one end-node module and one forwarding module, various other node configurations may be used. In one embodiment, at least a portion of the nodes of a communication network may include a forwarding module without an end-node module. In one embodiment, at least a portion of the nodes of a communication network may include an end-node module without a forwarding module. Furthermore, nodes may include any combination of one or more forwarding modules and/or one or more end-node modules. Although primarily depicted and described with respect to a specific node configuration including specific numbers and configurations of EIs 102, IIs 219, and NIs 112, nodes may be implemented using other numbers and combinations of EIs 102, IIs 219, and NIs 112.

Although primarily depicted and described with respect to a node including one end-node module, in one embodiment, in which a node includes multiple end-node modules, each end-node module of the node may be assigned a unique identifier. In such embodiments, since nodes may include zero end-node modules or multiple end-node modules, the number of bit positions required to implement the bit set for the communication network may be fewer than or more than the number of nodes in the network. For example, for a communication network having six nodes where three of the six nodes each include four end-node module and the other three of the six nodes only include a forwarding module, the number of bit positions required in order to uniquely identify each of the end-node modules in the network is twelve (i.e., one bit position for each of the twelve end-node modules) even though there are only six nodes in the network.

In one embodiment, at least a portion of the nodes of a communication network may include a forwarding module without an end-node module. FIG. 3 depicts an exemplary node including one forwarding module without an end-node module. As depicted in FIG. 3, exemplary node 300 is a node in a network having six end-node modules (which may be implemented using six nodes, or less nodes where one or more nodes includes multiple end-node modules). The exemplary node 300 includes four network interfaces having associated bit masks of 110000, 001000, 000100, and 000011. As described herein, packets intended for one or more of the six end-nodes are transmitted over one or more of the network interfaces according to the bit masks. Although depicted and described with respect to a specific number of network interfaces and bit masks having a specific number of bit positions, nodes according to the present invention may include various other numbers of interfaces and bit masks having various other numbers of bit positions.

Figure 4:
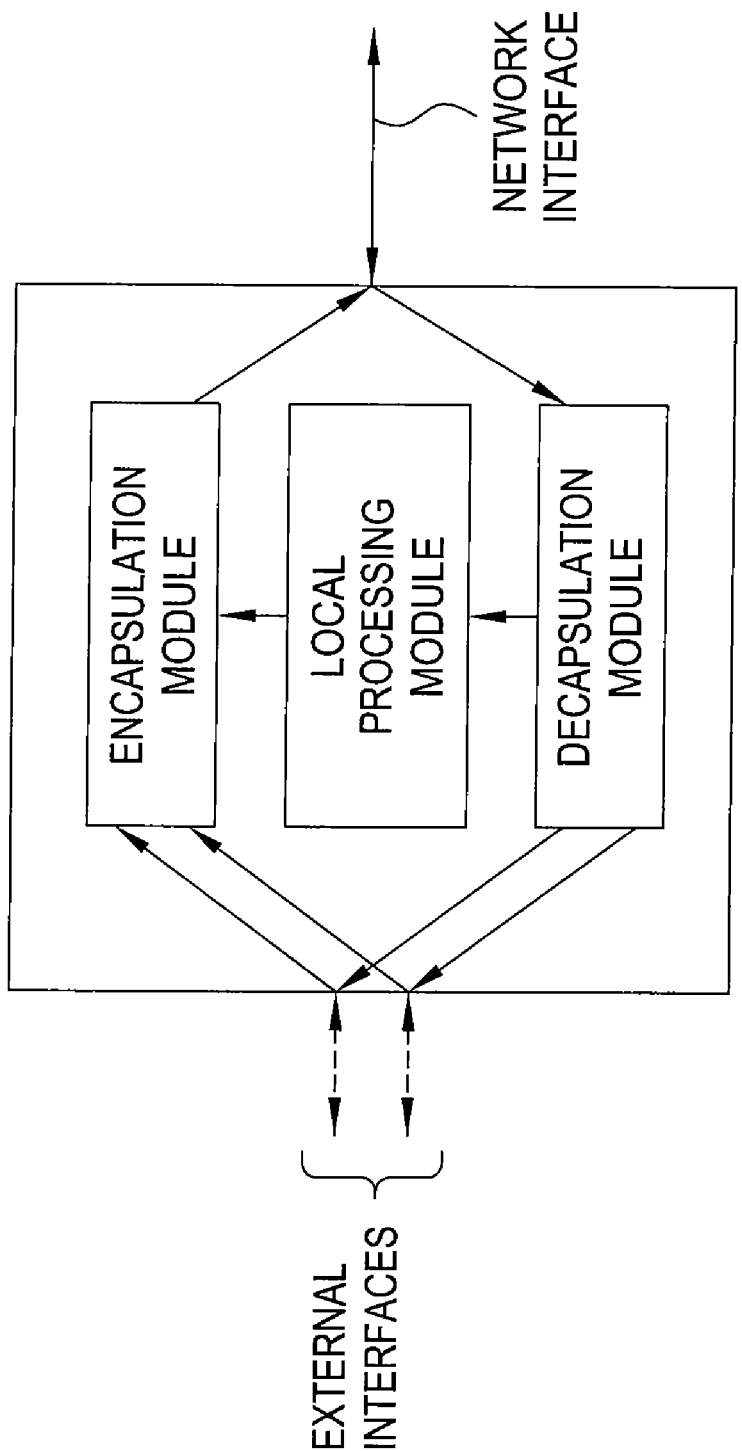
FIG. 4 depicts a high-level block diagram of an exemplary node including one end-node module without any forwarding modules.

In one embodiment, at least a portion of the nodes of a communication network may include an end-node module without a forwarding module. FIG. 4 depicts an exemplary node including one end-node module without a forwarding module. As depicted in FIG. 4, exemplary node 400 includes two external interfaces and one network interface. The two external interfaces provide packets to an encapsulation module and receive packets from a decapsulation module. Since exemplary node 400 does not include a forwarding module, packets received over the network interface include packets intended to be delivered to exemplary node 400. Although depicted and described with respect to a specific number of external interfaces and network interfaces, various other configurations may be implemented.

Figure 5:
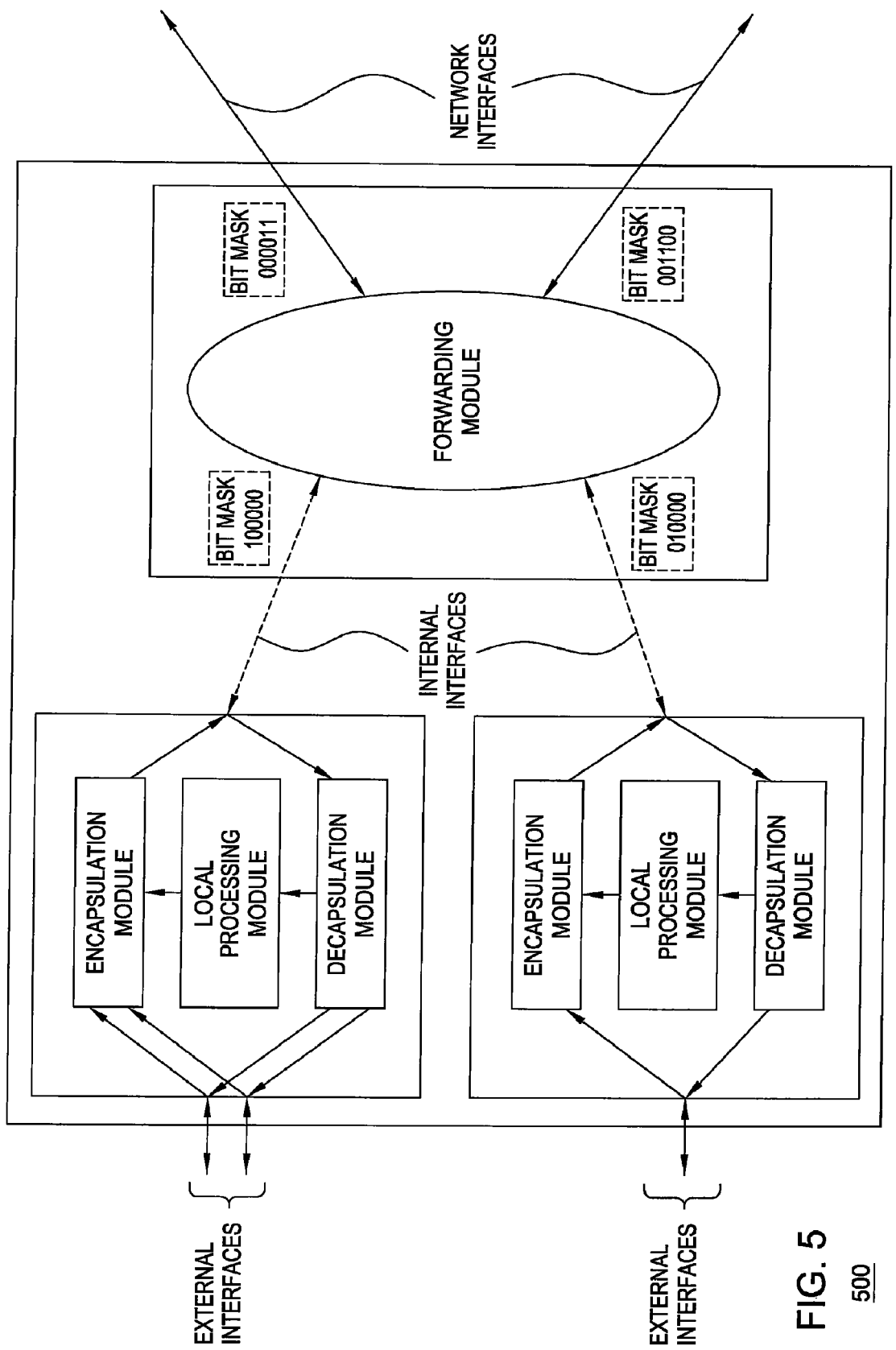
FIG. 5 depicts a high-level block diagram of an exemplary node including one forwarding module and two end-node modules.

In one embodiment, nodes may include any combination of one or more end-node modules and/or one or more forwarding modules. FIG. 5 depicts an exemplary node including two end-node modules and a forwarding module. As depicted in FIG. 5, exemplary node 500 is a node in a network having six end-node modules (two of which are included within exemplary node 500). The exemplary node 500 includes two network interfaces having bit masks of 001100 and 000011, and two internal interfaces having bit masks of 100000 and 010000. The two internal interfaces support the two end-node modules, respectively. Although depicted and described with respect to specific numbers and configurations of end-node modules (and associated external interfaces), internal interfaces, forwarding modules, and network interfaces, nodes according to the present invention may include various other numbers and configurations of such modules and interfaces.

Figure 6:
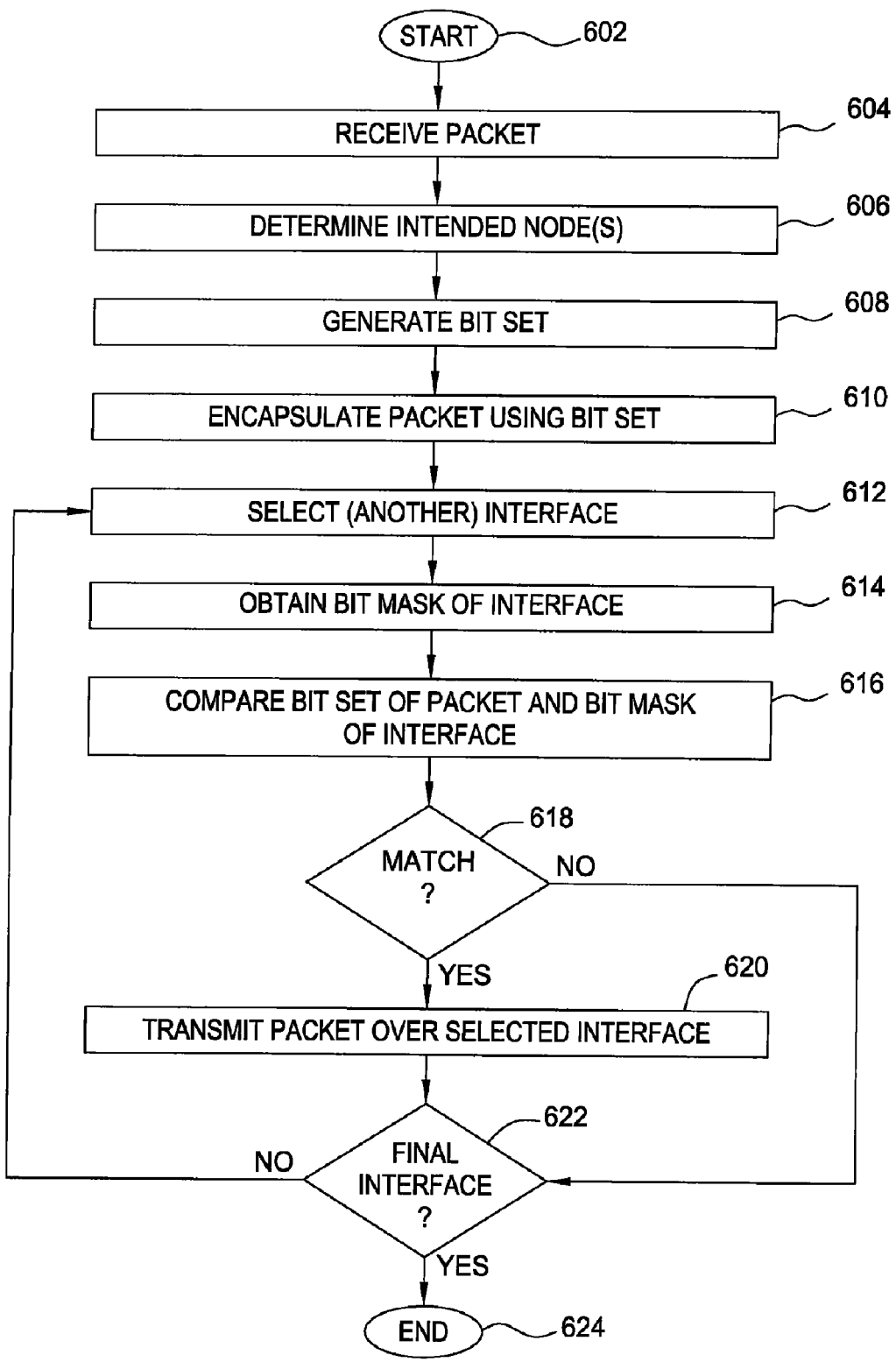
FIG. 6 depicts a method according to one embodiment of the present invention.

FIG. 6 depicts a method according to one embodiment of the present invention. Specifically, method 600 of FIG. 6 includes a method for processing a packet received over an external interface. The received packet is processed for transmitting the received packet over one or more network interfaces. Although depicted and described as being performed serially, at least a portion of the steps of method 600 of FIG. 6 may be performed contemporaneously, or in a different order than depicted and described in FIG. 6. The method 600 of FIG. 6 may be better understood with respect to FIG. 2. The method 600 begins at step 602 and proceeds to step 604.

At step 604, a packet is received at a node. In one embodiment, the packet is received over an external interface of the node. Although omitted for purposes of clarity, in one embodiment, instead of being received, the packet may originate from a module within the node. At step 606, the node(s) for which the received packet is intended is determined. The node(s) for which the received packet is intended may be determined according to an interface on which the packet is received, information included within the packet, and the like, as well as various combinations thereof.

At step 608, a bit set is generated. The bit set is generated based on the node(s) for which the packet is intended. At step 610, the received packet is encapsulated using the generated bit set. In one such embodiment, the bit set is prepended to the received packet as a label. At step 612, an interface is selected. The interface may be an internal interface (e.g., to another end-node module included within that node) or a network interface (i.e., to another node). At step 614, a bit mask of the selected interface is obtained. In one embodiment, the bit mask of the selected interface may be retrieved from memory using an interface identifier of the selected interface.

At step 616, the bit set of the packet is compared to the bit mask of the selected interface. In one embodiment, the comparison of the bit set of the packet and the bit mask of the selected interface is performed using a bitwise AND operation. As described herein, the bit set of the packet and bit mask of the interface are compared in order to determine whether one of the nodes for which the packet is intended matches one of the nodes associated with the selected interface.

At step 618, a determination is made as to whether one of the nodes for which the packet is intended matches one of the nodes associated with the selected interface. If one of the nodes for which the packet is intended does not match one of the nodes associated with the selected interface, method 600 proceeds to step 622. If one of the nodes for which the packet is intended matches one of the nodes associated with the selected interface, method 600 proceeds to step 620. At step 620, the packet is transmitted over the selected interface. From step 620, method 600 proceeds to step 622.

At step 622, a determination is made as to whether the final interface has been selected (i.e., the node at which the packet is received may include one or more internal interfaces and/or one or more network interfaces which must be considered to determine whether the packet should be transmitted over the interfaces). If the final interface has not been selected, method 600 returns to step 612, at which point another interface is selected. If the final interface has been selected, method 600 proceeds to step 624, where method 600 ends.

Figure 7:
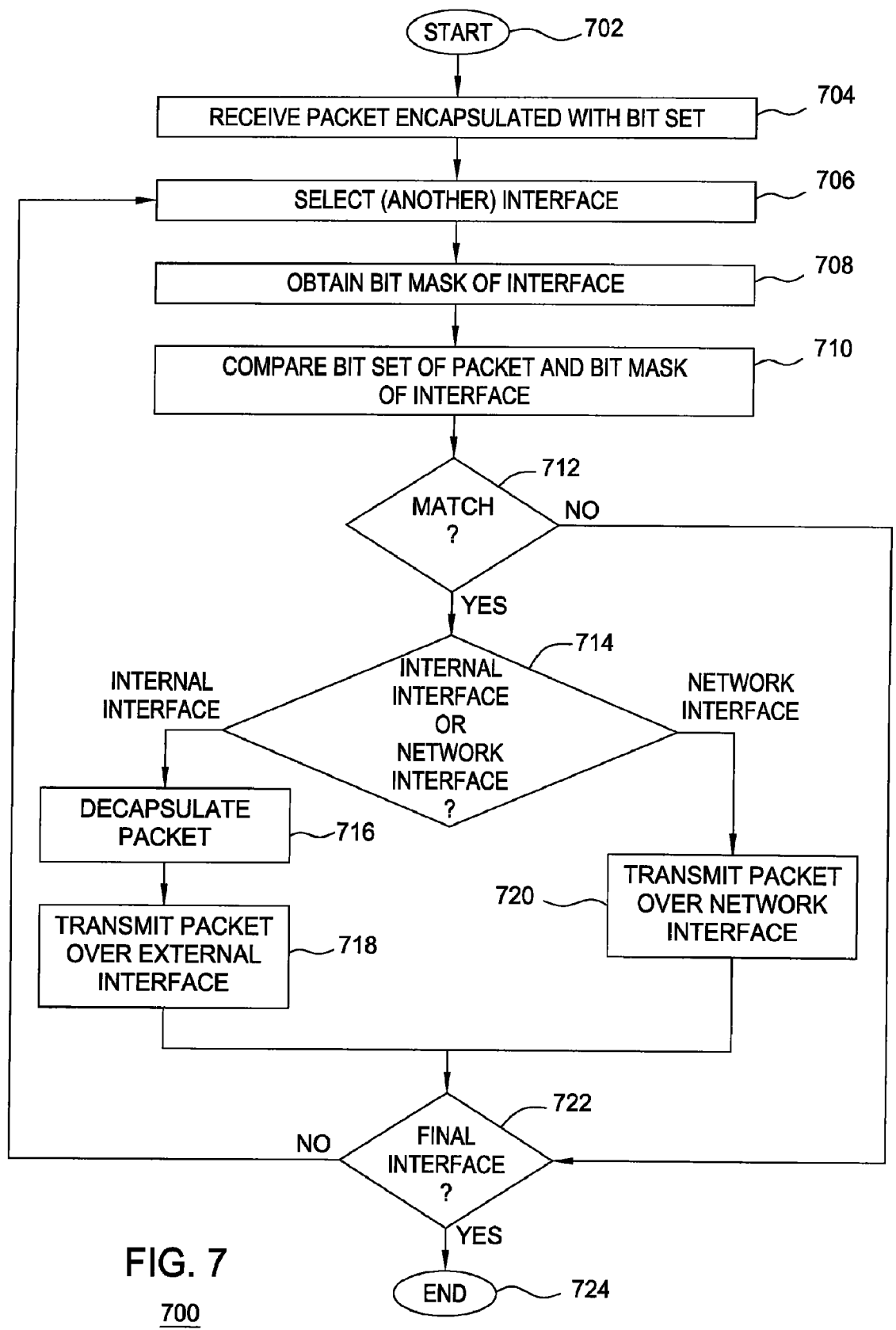
FIG. 7 depicts a method according to one embodiment of the present invention.

FIG. 7 depicts a method according to one embodiment of the present invention. Specifically, method 700 of FIG. 7 includes a method for processing a packet received over a network interface. The received packet is processed for transmitting the received packet over one or more internal interfaces and/or one or more network interfaces. Although depicted and described as being performed serially, at least a portion of the steps of method 700 of FIG. 7 may be performed contemporaneously, or in a different order than depicted and described in FIG. 7. The method 700 of FIG. 7 may be better understood with respect to FIG. 2. The method 700 begins at step 702 and proceeds to step 704.

At step 704, a packet is received. The received packet is encapsulated by an appended bit set. The packet is received over a network interface. At step 706, an interface is selected. The interface may be an internal interface (e.g., to an end-node module included within that node) or a network interface (i.e., to another node in the network). At step 708, a bit mask of the selected interface is obtained. In one embodiment, the bit mask of the selected interface may be retrieved from memory using an interface identifier of the selected interface.

At step 710, the bit set of the packet is compared to the bit mask of the selected interface. In one embodiment, the comparison of the bit set of the packet and the bit mask of the selected interface is performed using a bitwise AND operation. As described herein, the bit set of the packet and bit mask of the interface are compared in order to determine whether one of the nodes for which the packet is intended matches one of the nodes associated with the selected interface.

At step 712, a determination is made as to whether one of the nodes for which the packet is intended matches one of the nodes associated with the selected interface. If one of the nodes for which the packet is intended does not match one of the nodes associated with the selected interface (i.e., none of the nodes match), method 700 proceeds to step 722. If one of the nodes for which the packet is intended matches one of the nodes associated with the selected interface, method 700 proceeds to step 714.

At step 714, a determination is made as to whether the selected interface is an internal interface or a network interface. Although primarily depicted and described with respect to an explicit determination after the matching determination is performed, in one embodiment the determination as to the type of interface may be performed when the interface is selected, when the bit mask of the interface is obtained, or at some other time. If the selected interface is an internal interface, method 700 proceeds to step 716. If the selected interface is a network interface, method 700 proceeds to step 720.

As depicted in FIG. 7, if the interface is an internal interface, at step 716 the encapsulated packet is decapsulated. The encapsulated packet is decapsulated by removing the bit set. From step 716, method 700 proceeds to step 718. At step 718, the decapsulated packet is transmitted over one or more external interfaces. From step 718, method 700 proceeds to step 722. As depicted in FIG. 7, if the interface is a network interface, at step 720 the encapsulated packet is transmitted over the selected network interface. The present invention thereby enables the received packet to be delivered to one or more intended recipients associated with the node, as well as to be sent to one or more other nodes (i.e., the present invention supports simplified packet multicasting).

At step 722, a determination is made as to whether the final interface has been selected (i.e., the node at which the packet is received may include one or more internal interfaces and/or one or more network interfaces which must be considered to determine whether the packet should be transmitted over the interfaces). If the final interface has not been selected, method 700 returns to step 706, at which point another interface is selected. If the final interface has been selected, method 700 proceeds to step 724, where method 700 ends.

Although primarily depicted and described herein as being implemented with respect to external interfaces and network interfaces, the present invention may be equivalently implemented with respect to external ports and network ports. Similarly, internal interfaces depicted and described herein may be implemented using one or more ports on the end-user module (and/or ports associated with the encapsulation modules and decapsulation modules) and/or one or more ports on the forwarding module. In such embodiment, network ports and internal interfaces (and/or associated internal ports) associated with a forwarding module may have associated bit masks adapted for use in routing packets.

Although primarily depicted and described herein with respect to bit sets in which a bit position set to 1 indicates that the packet is intended for the node (or end-node module) associated with that bit position and a bit position set to 0 indicates that the packet is not intended for the node (or end-node module) associated with that bit position, in one embodiment, a 0 may be used to indicate that the packet is intended for the node and a bit position set to 1 may be used to indicate that the packet is not intended for the node. Although primarily depicted and described herein with respect to bit masks in which a bit position set to 1 indicates that the interface (or port) is associated with the node (or end-node module) associated with that bit position and a bit position set to 0 indicates that the interface is not associated with the node (or end-node module) associated with that bit position, in one embodiment, a bit position set to 0 may be used to indicate that the interface is associated with the node and a bit position set to 1 may be used to indicate that the interface is not associated with the node. Although described with respect to specific values which may be used in bit sets and bit masks, various other combinations of values may be used.

As described herein, the present invention may be used in various different networks, such as IP networks, MPLS networks, Ethernet networks, and the like, as well as various combinations thereof. It should be noted that the use of bit sets and bit masks limits the number of nodes (end-nodes) which may be included within a network according to the present invention. For example, typical label sizes (in number of bits) are 32 bits for IPv4, 128 bits for IPv6, 20 bits for MPLS, and 48 bits for Ethernet, resulting in networks of at most 32, 128, 20, and 48 nodes (or end-node modules), respectively. In order to increase the number of nodes which may be supported by networks according to the present invention, bit sets (i.e., labels), and, optionally, bit masks, may be implemented using formats other than including a different bit position for each node (end-node module) in the network.

Although primarily depicted and described herein with respect to embodiments in which a node (or end-node module) is uniquely identified using a bit position of a bit set or a bit mask, in other embodiments a node (or end-node module may be uniquely identified using a number identifying the bit that would be set in the bit set or bit mask if a bit set or bit mask were being used. For example, rather than using a bit set having 4 bit positions in a network having 4 end-nodes, the nodes may be uniquely identified using the numbers 1, 2, 4, and 8. These embodiments require fewer bits to encode the information (than embodiments using bit sets and bit masks), thereby reducing network resources consumed by the present invention and increasing the network size of networks in which the present invention may be implemented.

Figure 8:
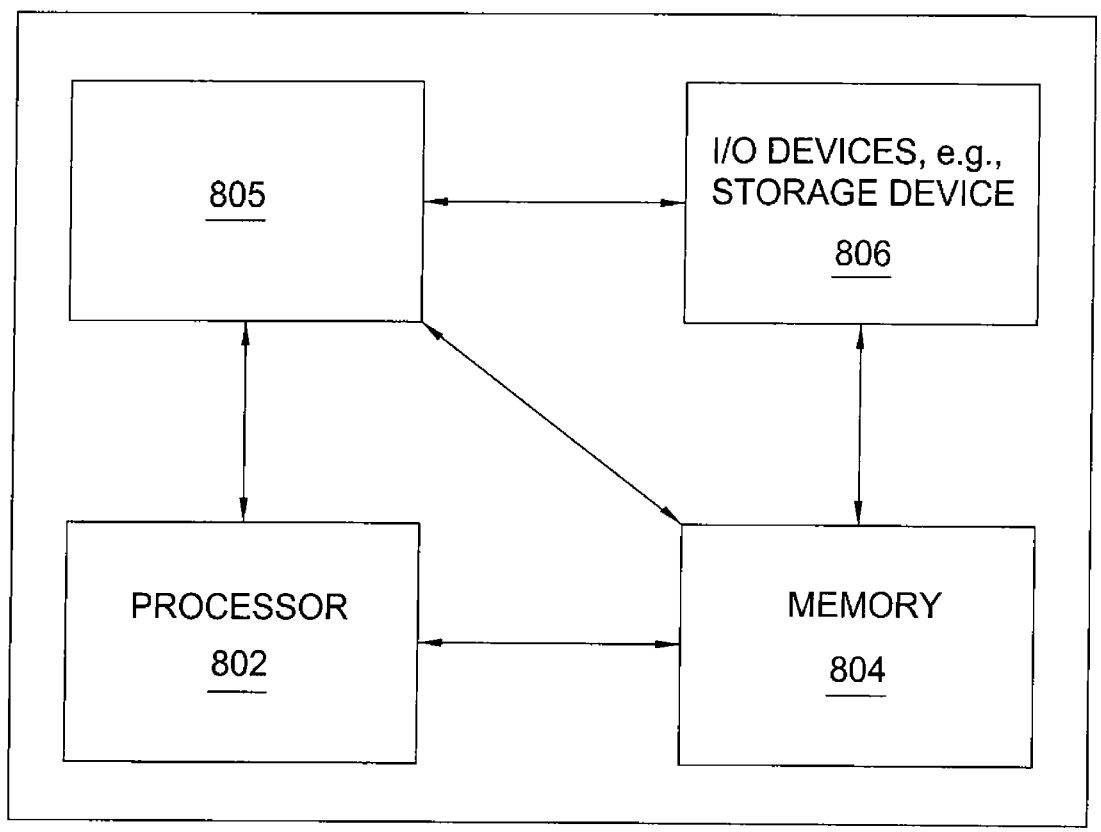
FIG. 8 depicts a high-level block diagram of a general-purpose computer suitable for use in performing the functions described herein.

FIG. 8 depicts a high-level block diagram of a general-purpose computer suitable for use in performing the functions described herein. As depicted in FIG. 8, system 800 comprises a processor element 802 (e.g., a CPU), a memory 804, e.g., random access memory (RAM) and/or read only memory (ROM), a routing control module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present routing control process 805 can be loaded into memory 804 and executed by processor 802 to implement the functions as discussed above. As such, routing control process 805 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for transmitting packets in a communication network comprising a plurality of nodes, comprising:
encapsulating, at one of the nodes, a packet intended for at least one of the nodes, wherein the packet is encapsulated using a bit set comprising a plurality of bit positions associated with a respective plurality of processing modules of the nodes of the communication network, the bit positions of the bit set being set in a manner for identifying each of the at least one of the processing modules for which the packet is intended;
for each of the plurality of interfaces of the one of the nodes including at least one network interface of the one of the nodes and at least one internal interface to at least one processing module of the one of the nodes, comparing the bit set of the packet and a bit mask of the interface, the bit mask comprising a plurality of bit positions associated with the respective plurality of processing modules of the nodes of the communication network, the bit positions of the bit mask being set in a manner for identifying each of the processing modules available from the interface; and
for each of the interfaces for which a determination is made that the comparison of the bit set and the bit mask indicates that one of the processing modules for which the packet is intended is the same as one of the processing modules available from the interface, forwarding the packet over the interface.

2. The method of claim 1, wherein encapsulating the packet comprises:
determining each of the at least one processing module for which the packet is intended; and
setting the bit positions of the bit set in a manner for identifying each of the at least one processing module for which the packet is intended.

3. The method of claim 1, wherein the at least one processing module for which the packet is intended is identified using at least one of an external interface over which the packet is received or information included within the received packet.

4. The method of claim 1, wherein comparing the bit set of the packet and the bit mask of the interface comprises:
performing a bitwise AND operation using the bit set of the packet and the bit mask of the interface to produce a comparison result.

5. The method of claim 4, wherein the packet is forwarded over the interface in response to at least one bit position of the comparison result being equal to one.

6. An apparatus for transmitting packets in a communication network comprising a plurality of nodes, comprising:
a processor and a memory, the processor configured to:
encapsulate a packet intended for at least one of the nodes, wherein the packet is encapsulated using a bit set comprising a plurality of bit positions associated with a respective plurality of processing modules of the nodes of the communication network, the bit positions of the bit set being set in a manner for identifying each of the at least one of the processing modules for which the packet is intended;
for each of a plurality of interfaces of the one of the nodes including at least one network interface of the one of the nodes and at least one internal interface to at least one processing module of the one of the nodes, compare the bit set of the packet and a bit mask of the interface, the bit mask comprising a plurality of bit positions associated with the respective plurality of processing modules of the nodes of the communication network, the bit positions of the bit mask being set in a manner for identifying each of the processing modules available from the interface; and
for each of the interfaces for which a determination is made that the comparison of the bit set and the bit mask indicates that one of the processing modules for which the packet is intended is the same as one of the processing modules available from the interface, forward the packet over the interface.

7. The apparatus of claim 6, wherein the processor is configured to encapsulate the packet by:
determining each of the at least one processing module for which the packet is intended; and
setting the bit positions of the bit set in a manner for identifying each of the at least one processing module for which the packet is intended.

8. The apparatus of claim 6, wherein the at least one processing module for which the packet is intended is identified using at least one of an external interface over which the packet is received or information included within the received packet.

9. The apparatus of claim 6, wherein the processor is configured to compare the bit set of the packet and the bit mask of the interface by:
performing a bitwise AND operation using the bit set of the packet and the bit mask of the interface to produce a comparison result.

10. The apparatus of claim 9, wherein the processor is configured to forward the packet over the interface in response to at least one bit position of the comparison result being equal to one.

11. A method for transmitting packets in a communication network comprising a plurality of nodes, comprising:
receiving, at one of the nodes, a packet comprising a bit set comprising a plurality of bit positions associated with a respective plurality of processing modules of the nodes of the communication network, the bit positions of the bit set being set in a manner for identifying each of the processing modules for which the packet is intended;
for each of the plurality of interfaces of the one of the nodes including at least one network interface of the one of the nodes and at least one internal interface to at least one processing module of the one of the nodes, comparing the bit set of the packet and a bit mask of the interface, the bit mask comprising a plurality of bit positions associated with the respective plurality of processing modules of the nodes of the communication network, the bit positions of the bit mask being set in a manner for identifying each of the processing modules available from the interface; and
for each of the interfaces for which a determination is made that the comparison of the bit set and the bit mask indicates that one of the processing modules for which the packet is intended is the same as one of the processing modules available from the interface, forwarding the packet over the interface.

12. The method of claim 11, wherein comparing the bit set of the packet and the bit mask of the interface comprises:
performing a bitwise AND operation using the bit set of the packet and the bit mask of the interface to produce a comparison result.

13. The method of claim 11, further comprising:
when the packet is forwarded via an internal interface, decapsulating the packet and processing the decapsulated packet.

14. The method of claim 13, further comprising:
re-encapsulating the packet; and
forwarding the re-encapsulated packet via a network interface of the one of the nodes.

15. The method of claim 11, further comprising:
when the packet is forwarded via a network interface, decapsulating the packet and forwarding the decapsulated packet over an external interface of the one of the nodes.

16. An apparatus for transmitting packets in a communication network comprising a plurality of nodes, comprising:
a processor and a memory, the processor configured to:
receive, at one of the nodes, a packet comprising a bit set comprising a plurality of bit positions associated with a respective plurality of processing modules of the nodes of the communication network, the bit positions of the bit set being set in a manner for identifying each of the processing modules for which the packet is intended;
for each of a plurality of interfaces of the one of the nodes including at least one network interface of the one of the nodes and at least one internal interface to at least one processing module of the one of the nodes, compare the bit set of the packet and a bit mask of the interface, the bit mask comprising a plurality of bit positions associated with the respective plurality of processing modules of the nodes of the communication network, the bit positions of the bit mask being set in a manner for identifying each of the processing modules available from the interface; and
for each of the interfaces for which a determination is made that the comparison of the bit set and the bit mask indicates that one of the processing modules for which the packet is intended is the same as one of the processing modules available from the interface, forward the packet over the interface.

17. The apparatus of claim 16, wherein the processor is configured to compare the bit set of the packet and the bit mask of the interface by:
performing a bitwise AND operation using the bit set of the packet and the bit mask of the interface to produce a comparison result.

18. The apparatus of claim 16, wherein the processor is further configured to:
when the packet is forwarded via an internal interface, decapsulated the packet and processing the decapsulated packet.

19. The apparatus of claim 18, wherein the processor is further configured to:
re-encapsulating the packet; and
forwarding the re-encapsulated packet via a network interface of the one of the nodes.

20. The apparatus of claim 16, wherein the processor is further configured to:
when the packet is forwarded via a network interface, decapsulated the packet and forward the decapsulated packet over an external interface of the one of the nodes.

* * * * *